(12) United States Patent
Florman (10) Patent No.: US 8,979,043 B2
(45) Date of Patent: Mar. 17, 2015

(54) MULTIPLE-USE BRACKET FOR LIGHTING DEVICE INSTALLATION

(71) Applicant: Steven Florman, San Diego, CA (US)

(72) Inventor: Steven Florman, San Diego, CA (US)

( * ) Notice: Subject to any disclaimer, the term of this patent is extended or adjusted under 35 U.S.C. 154(b) by 0 days.

(21) Appl. No.: 13/886,532

(22) Filed: May 3, 2013

(65) Prior Publication Data

US 2013/0240690 A1    Sep. 19, 2013

Related U.S. Application Data

(60) Provisional application No. 61/801,580, filed on Mar. 15, 2013.

(51) Int. Cl.
```
A47F 5/00       (2006.01)
A47H 1/10       (2006.01)
F21V 19/00      (2006.01)
F21V 21/00      (2006.01)
B23P 19/00      (2006.01)
B23P 15/00      (2006.01)
```
(52) U.S. Cl.
CPC ............. *F21V 21/00* (2013.01); *B23P 19/00* (2013.01); *B23P 15/00* (2013.01)
USPC ........... 248/200; 248/247; 248/248; 248/237; 248/218.1; 248/218.4; 248/539; 248/538; 248/520; 248/534; 248/518; 248/519; 248/152; 248/536; 248/174; 248/300; 362/382; 362/431; 362/457

(58) Field of Classification Search
USPC ........... 248/200, 247, 248, 237, 218.1, 218.4, 248/539, 538, 520, 534, 518, 519, 152, 72, 248/536, 174, 300; 362/382, 431, 457
See application file for complete search history.

(56) References Cited

U.S. PATENT DOCUMENTS

| | | | | |
|---|---|---|---|---|
| 2,208,358 A | * | 7/1940 | Chandler | 248/540 |
| 2,855,107 A | * | 10/1958 | Roth | 211/70.6 |
| 3,754,636 A | * | 8/1973 | Boy | 198/850 |
| 4,644,728 A | * | 2/1987 | Stauss et al. | 52/710 |
| 4,734,830 A | | 3/1988 | Cristian | |
| 4,856,616 A | * | 8/1989 | Anderson | 182/113 |
| 5,406,448 A | * | 4/1995 | Anderson et al. | 361/600 |
| 5,913,787 A | * | 6/1999 | Edwards | 52/220.7 |
| 6,158,180 A | * | 12/2000 | Edwards | 52/220.7 |
| 7,017,947 B1 | * | 3/2006 | Diggle, III | 285/61 |
| 7,278,240 B2 | | 10/2007 | Burkart | |
| 7,988,320 B2 | | 8/2011 | Brumels | |
| 8,027,092 B1 | | 9/2011 | Huff | |
| 8,190,301 B2 | | 5/2012 | Voysey | |

* cited by examiner

*Primary Examiner* — Christopher Garft
(74) *Attorney, Agent, or Firm* — TJSL Patent Clinic; Peter Hackmann (57) ABSTRACT

This application discloses a bracket device used for mounting outdoor solar lighting on various types of surfaces, including but not limited to block walls, chain link fences, wooden fences and flat walls or for holding outdoor solar lighting devices as stand-alone fixtures.

12 Claims, 11 Drawing Sheets

MULTIPLE-USE BRACKET FOR LIGHTING DEVICE INSTALLATION

PRIORITY CLAIM

This application claims the benefit of priority from U.S. Provisional Patent Application Ser. No. 61/801,580, entitled "Multi-Use Bracket for Multiple-Device Installation" and filed Mar. 15, 2013, which is fully incorporated herein by reference for all purposes.

BACKGROUND

1. Field of the Application

This disclosure is directed to the mounting of lighting, among other devices, and more specifically to brackets used for mounting outdoor solar lighting devices on various types of surfaces, including but not limited to block walls, chain link fences, wooden fences and flat walls or holding outdoor solar lighting devices as stand-alone fixtures.

2. Background of the Disclosure

Outdoor lighting is not only useful for illuminating a home, but also for adding security and beauty. Exterior lighting is available in low-voltage, solar models that are both attractive and easy to install. Solar lighting is environmentally friendly and nearly cost-free to operate. Solar-powered models absorb energy from sunlight, convert it into electrical energy, and store it in rechargeable solar batteries. At dusk, a small photocell fixture turns the lights on. The lights remain illuminated for a specific amount of time, until the batteries run out of charge or the sensor detects sufficient daylight to turn them off. When the sun comes up, the batteries are recharged. Thus, solar lighting must be placed in an area that allows the built-in solar panel to collect and convert sunlight into electric power, while the pre-installed rechargeable battery stores the energy to power the light at night.

Stand-alone, outdoor solar lights are generally installed using holding posts for insertion into the ground, for example along an outdoor walking path or around an outdoor patio area. These commercially-available holding posts can have a diameter that is variable, but typically is about one inch and a quarter or less and they can be up to many feet in length, depending on how high off the ground someone may want the solar light. However, typically the holding posts are around one to two feet in length. One end of the holding post may be fitted with an adapter for attaching the solar light (e.g., possibly something similar to a camera tripod attachment for a camera) and the other end of the holding post is usually pointed to facility an easier insertion into the ground.

As can be seen, the solar lights with holding posts are limited to being installed by inserting them into the ground. However, this installation method is not always desired or desirable, and is even impossible in some situations. Therefore, what is needed is a bracket or fixture that facilitates installation of the outdoor, solar lights (with or without the holding posts) in a multitude of locations, including stand-alone uses.

SUMMARY

In certain embodiments, an apparatus for mounting a solar light post to any one of a plurality of objects includes: a main support structure, the main support structure having a substantially flat main shape, a main upper end and a main lower end; a top, the top having a substantially flat top shape, a top front end and a top back end, the top back end being connected to the main upper end by an approximate ninety degree angle in a forward direction approximately perpendicular to a main plane of the substantially flat main shape; a top face, the top face having a substantially flat top face shape and a top face upper, the top face upper end being connected to the top front end by an approximate ninety degree angle in a downward direction approximately perpendicular to a top plane of the substantially flat top shape; a bottom, the bottom having a substantially flat bottom shape, a bottom front end and a bottom back end, the bottom back end being connected to the main lower end by an approximate ninety degree angle in a forward direction approximately perpendicular to the main plane of the substantially flat main shape; a bottom face, the bottom face having a substantially flat bottom face shape, a bottom face upper end and a bottom face lower end, the bottom face lower end being connected to the bottom front end by an approximate ninety degree angle in a upward direction approximately perpendicular to a bottom plane of the substantially flat bottom shape; and a bottom lip, the bottom lip having a substantially flat bottom lip shape and a bottom lip front end, the bottom lip front end being connected to the bottom face upper end by an approximate ninety degree angle in a backward direction approximately perpendicular to a bottom face plane of the substantially flat shape.

In certain embodiments, a method for making a bracket includes producing one or more basic bracket shapes, making a plurality of detailed shapes on the one or more basic bracket shapes, forming the bracket from the one or more basic bracket shapes, and finishing the bracket.

In certain embodiments, an apparatus for mounting a solar light post to any one of a plurality of objects includes means for producing one or more basic bracket shapes, means for making a plurality of detailed shapes on the one or more basic bracket shapes, means for forming the bracket from the one or more basic bracket shapes, and means for finishing the bracket.

BRIEF DESCRIPTION OF THE DRAWINGS

The accompanying drawings, which are incorporated in and constitute a part of this specification, illustrate various embodiments of the present disclosure.

DETAILED DESCRIPTION

Before describing in detail certain embodiments of the disclosure, it should be observed that the embodiments reside using a lighting system and device and methods thereof. Accordingly, the system and device and methods thereof have been represented, where appropriate, by conventional symbols in the drawings, showing only those specific details that are pertinent to understanding the embodiments of the present disclosure so as not to obscure the disclosure with details that will be readily apparent of those of ordinary skill in the art having the benefit of description herein.

In this document, relational terms, such as first and second, top and bottom, and the like, may be used to distinguish one view, entity or action, without necessarily requiring or implying any actual such relationship or order between such views, entities or actions. The terms "comprises," "comprising," "has," "having," "includes," "including" or any other variations thereof, are intended to cover a non-exclusive inclusion, such that a process, method, article, or apparatus that comprises a list of elements that does not include only those elements, but may include other elements not expressly listed or inherent to such process, method, article or apparatus. An element proceeded by "comprises . . . a" does not, without more constraints, preclude the existence of additional identical elements in the process, method, article, or apparatus that comprises the element.

The following detailed description is directed to certain sample embodiments. However, the disclosure can be embodied in a multitude of different ways as defined and covered by the claims and equivalents thereof. In this description, reference is made to the drawings wherein like parts are designated with like reference numerals throughout.

Figure 1:
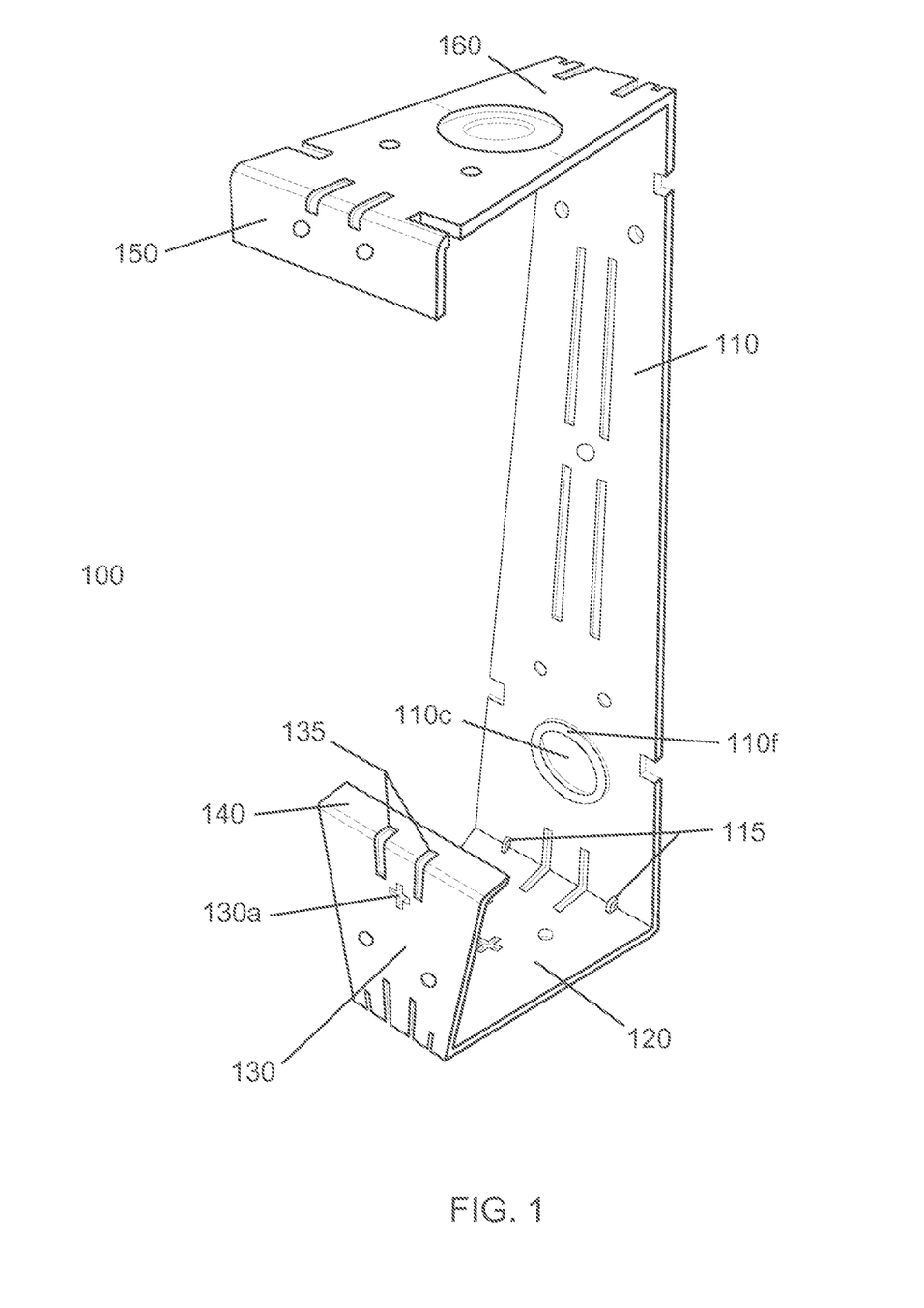
FIG. 1 illustrates an exemplary front isometric view of the bracketing device as viewed from a top right angle according to certain embodiments.

FIG. 1 illustrates an exemplary front isometric view of a bracketing device 100 as viewed from a top right angle according to certain embodiments. Bracketing device 100 embodied in FIG. 1 is generally in the shape of the letter "G" or an inverted "G" (i.e., depending on the viewing angle), consisting of an outside top face 150, an outside top 160, a main inside support structure 110, an inside bottom 120, an outside bottom face 130, and a bottom lip 140. Each piece just listed is connected at approximately a ninety-degree angle to its adjacent or adjoining piece. At the angled joints or corners of bracketing device 100, facing inward is a pair of reinforcing gusset rib dents 115 (e.g., at the intersection of main inside support structure 110 and inside bottom 120); there also is a pair of accessory attachment slot shaped openings 135 (e.g., at the intersection of outside bottom face 130 and bottom lip 140). Note that similar gusset rib dents 115 and similar accessory attachment slot shaped openings 135 may or may not be needed or designed in at every angled joint or corner of bracketing device 100 in all embodiments. As shown, accessory attachment slot shaped openings similar to accessory attachment slot shaped openings 135 are also cut into bracketing device 100 at the intersection of faces 110 and 120, 120 and 130, 110 and 160, and 150 and 160. Gusset rib dents similar to gusset rib dents 135 are also cut into the bracketing device at the intersection of faces 120 and 130, and 110 and 160.

Outside bottom face 130 is connected to bottom lip 140 by approximately a ninety-degree angle. Outside bottom face 130 provides an approximately flat, flush surface where outside top 140 and outside top face 150 is used in the embodiment of the bracketing device mounted on a wooden fence. An anti-rotation opening 130a is provided, for example, for the bottom of a flag pole, lighting device post, or other structure to rest in and provide and an anchoring point when a device is inserted through the lighting or flag post hole 110c.

Inside main support structure 110 is connected to both inside bottom 120 and outside top 160 by approximately ninety-degree angles. A small light post or flag post hole 110c approximately one half the width of the support bracket is located approximately in the bottom one-third of the support structure as a means to insert a flag post, or the post of a lighting or other device. If the post of the flag, lighting, or other device is larger in diameter than small light or flag post opening 110c, a punch out ring 110f is provided as a concentric opening cutout that can be removed to allow for a larger post to be inserted into the opening. As shown, small hole 110c is approximately 0.88 inches in diameter and with punch out ring 110f removed, the larger hole is approximately 1.32 inches in diameter. Note that variations of the size and shape of these holes and the punch out are intended to be within the scope of this application.

The inside main support structure 110 is connected to the outside top 160 by approximately a ninety-degree angle. Outside top face 150 is connected at approximately a ninety-degree angle from outside top 160. There is at least one set of peg board hook holes on the face of outside top 150. Outside top 160 is longer in length than inside bottom 120 to allow the bracketing device to be mounted horizontally along the long edge of 110 on a structure such as a block wall.

In certain embodiments, bracketing device 100 can have the following general dimensions. Main inside support structure 110 can have a main length of approximately 11.63 inches, a main upper end width of approximately 1.75 inches and a main lower end width of approximately 3.75 inches. Outside top 160 can have a top length of approximately 4.38 inches, a top front end width of approximately 2.50 inches and a top back end width of approximately 1.75 inches. Top face 150 can have a top face length of approximately 0.88 inches and a top face width of approximately 2.50 inches. Inside bottom 120 can have a bottom length of approximately 3.50 inches, a bottom front end width of approximately 2.75 inches and a bottom back end width of approximately 3.75 inches. Outside bottom face 130 face can have a bottom face length of approximately 2.63 inches, a bottom face lower end width of approximately 2.75 inches and a bottom face upper end width of approximately 3.25 inches. Bottom lip 140 can have a bottom lip length of approximately 0.50 inches and a bottom lip width of approximately 3.25 inches. It is intended at least one of these dimensions can be altered a little or a lot and still be within the scope of the application. For example, such alterations might account for manufacturing tolerances, might account for differences between inside and outside measurements, given the material used, or simply might be a design choice.

Figure 2:
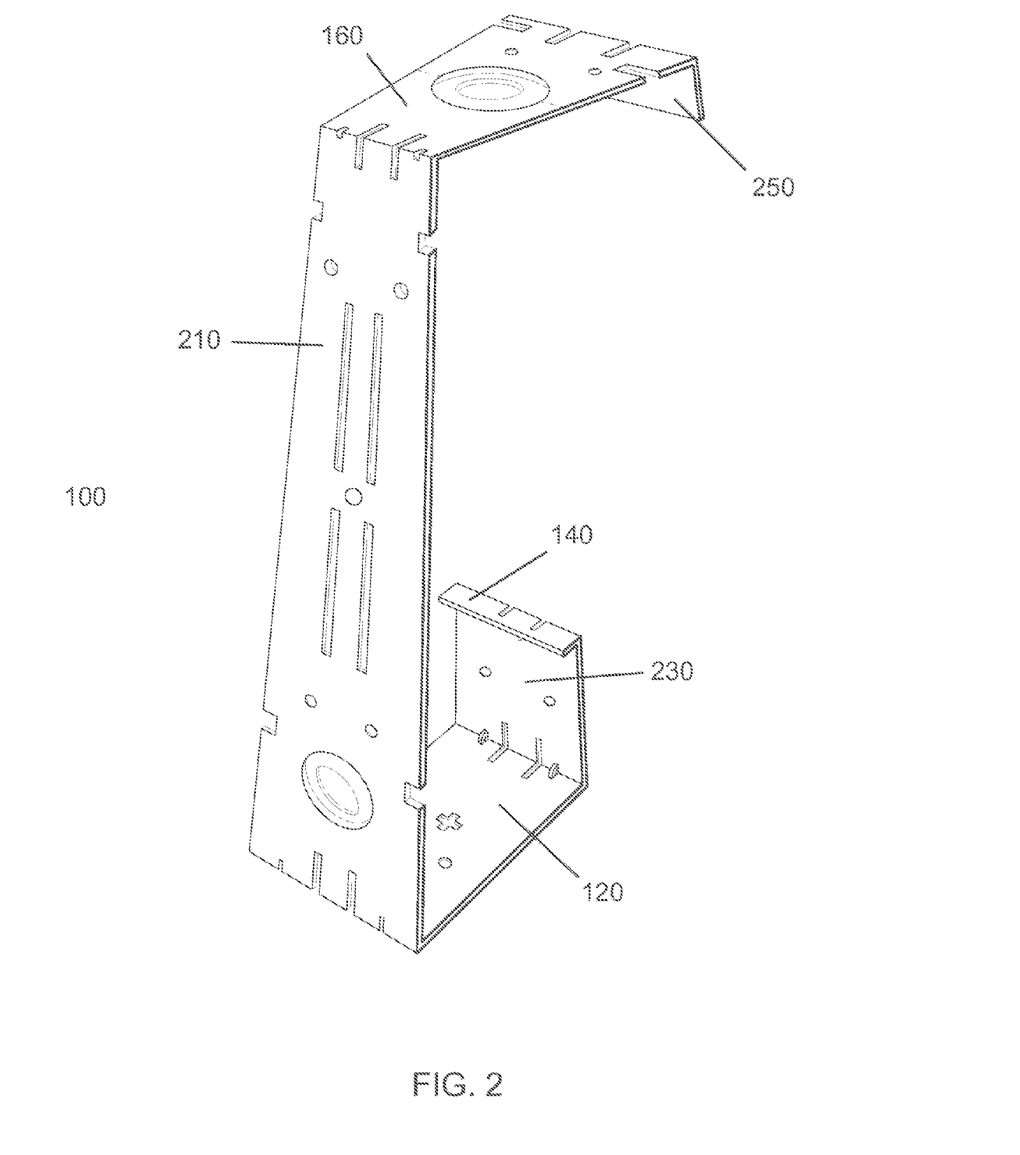
FIG. 2 illustrates an exemplary rear isometric view of the bracketing device according to certain embodiments.

FIG. 2 illustrates an exemplary rear isometric view of bracketing device 100 according to certain embodiments. Bottom lip 140 is connected to the inside bottom face 230 by approximately a ninety-degree angle. Inside bottom face 230 is connected by approximately a ninety-degree angle to inside bottom 120. Inside bottom 120 is connected to the outside main support structure 210 by approximately a ninety-degree angle. Outside main support structure 210 is connected to outside top 160 by approximately a ninety-degree angle. The inside top face 250 is connected to outside top 160 by approximately a ninety-degree angle.

Figure 3:
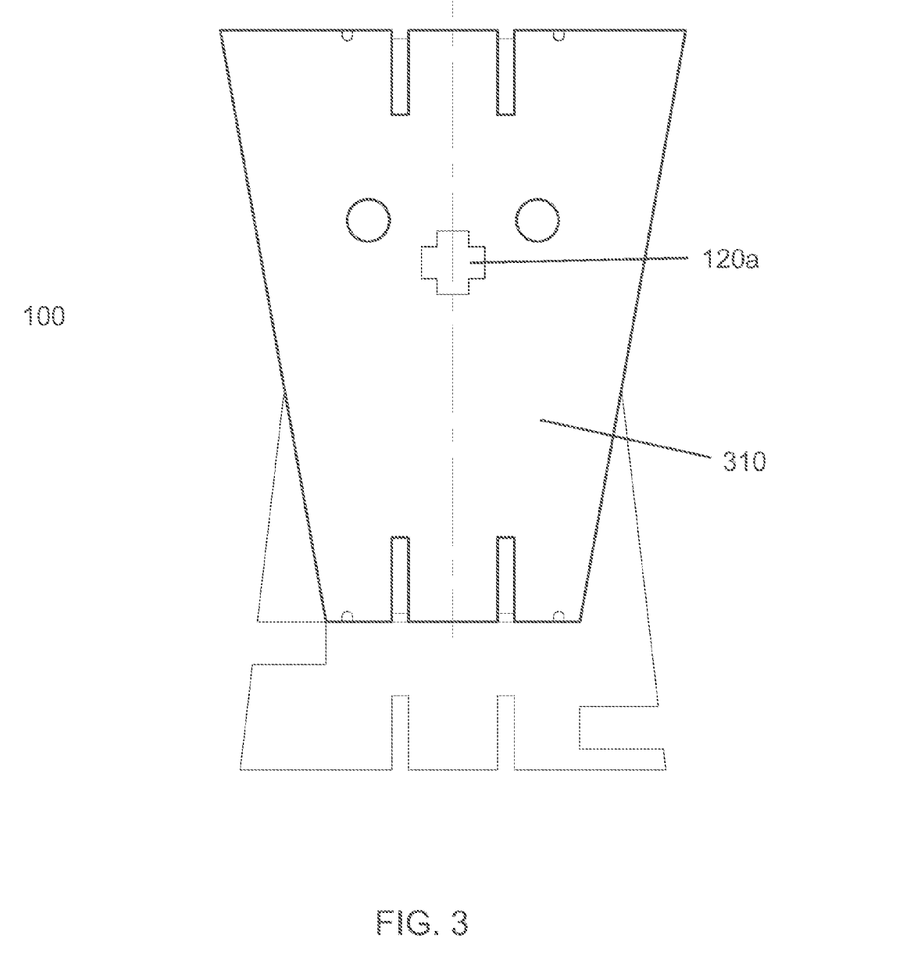
FIG. 3 illustrates an exemplary bottom-view of the bracketing device according to certain embodiments.

FIG. 3 illustrates an exemplary bottom-view of bracketing device 100 according to certain embodiments. Outside bottom 310 (which is the side opposite from inside bottom 120 as previously illustrated) provides an approximately flat, flush surface that can rest, for example, on top of a shelf as in an embodiment of bracketing device 100 mounted on a shelf. As shown, outside bottom 310 has a slightly tapered dimensionality, with a top (as illustrated) edge being approximately 3.75 inches long and a bottom (as illustrated) edge being approximately 2.75 inches long. As with all dimensions in this disclosure, variations are expected and meant to be included within the scope of this application.

Approximately centered in outside bottom 310 is anti-rotation opening 120a provided, for example, for the bottom of a flag pole, lighting device post, or other structure to rest in and provide an anchoring point when a device is inserted through the lighting or flag post hole 160c (not shown). There are also two cut-outs in a shape such as a circle and at a distance from each other to allow, for example, peg board hooks, screws, or some other attachment point to be inserted to secure the bracketing device to wall, fence, peg board, or other structure.

Figure 4:
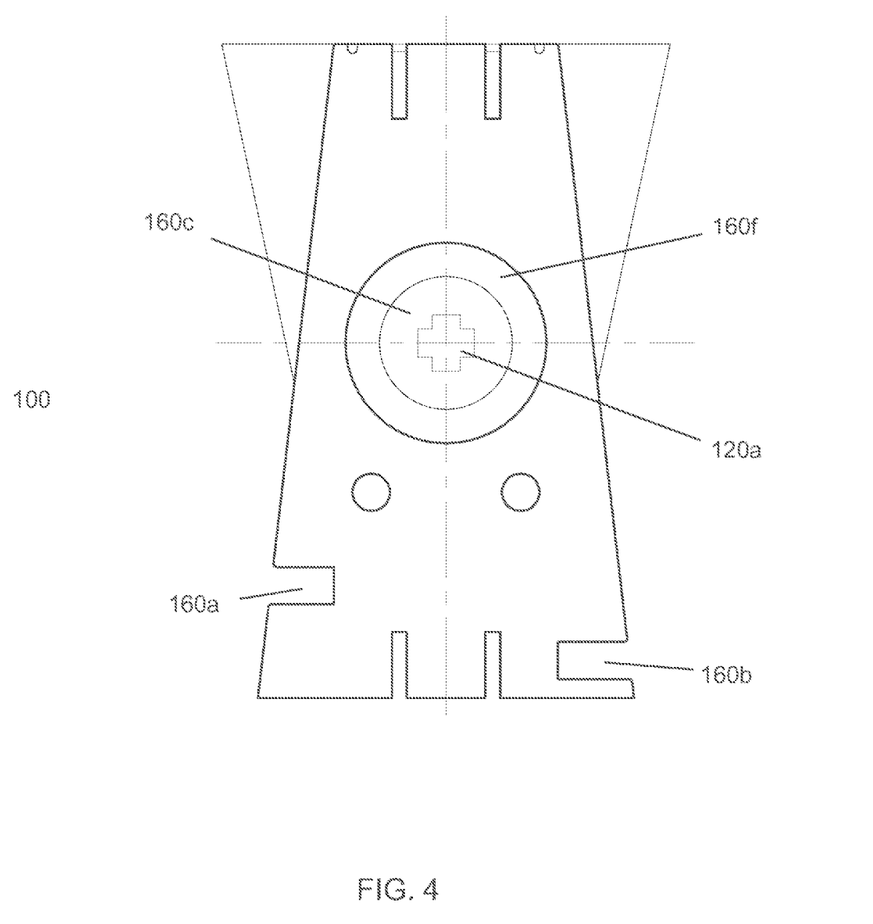
FIG. 4 illustrates an exemplary top-view of the bracketing device according to certain embodiments.

FIG. 4 illustrates an exemplary top-view of bracketing device 100 according to certain embodiments. A small light or flag post hole 160c, approximately the same size as hole 110c discussed with reference to FIG. 1, is used as a means to insert a flag post, or the post of a lighting or other device. However, the shape and size of this hole may be different from that of hole 110c. If the post of the flag, lighting, or other device is larger in diameter than small light or flag post opening 160c, punch-out 160f is provided as a concentric opening cutout that can be removed to allow for a larger post to be inserted into the opening. As shown, bracketing device 100 top-view has a slightly tapered dimensionality, with a top (as illustrated) edge being approximately 1.75 inches long and a bottom (as illustrated) edge being approximately 2.50 inches long. As with all dimensions in this disclosure, variations are expected and meant to be included within the scope of this application.

Centered on 160c and centered in inside bottom 120 is anti-rotation opening 120a provided for the bottom of a flag pole, lighting device post, or other structure to rest in and provide and an anchoring point when a device is inserted through the lighting or flag post hole 160c. There are also two cut-outs in a shape such as a circle at a distance from each other to allow for peg board hooks, screws, or some other attachment point to be inserted to secure the bracketing device to wall, fence, peg board, or other structure.

In approximately the distal one-third of the face are two notches, a notch for the right side of a chain link fence attachment 160a and a left side of a chain link fence attachment 160b. Each notch 160a and 160b are approximately 0.375 inches wide and approximately 0.25 inches long. The notches are offset from one another in such a way to allow outside top 160, when placed on the top of a chain link fence, to rest horizontally and in balance with the chain link fence. The outside top opening 160c is further to the inside of the bracketing device such that the post from the lighting device can be placed through the opening when notches 160a and 160b are resting on or in the top of a chain link fence.

The distal portion of inside bottom 120 is visible showing that the distal end is larger than the attachment to inside main support structure 110 allowing the bottom of the bracketing device to rest on a shelf, but also providing symmetrical top and bottom of the device to fit in a metal sheet for manufacturing.

Figure 5:
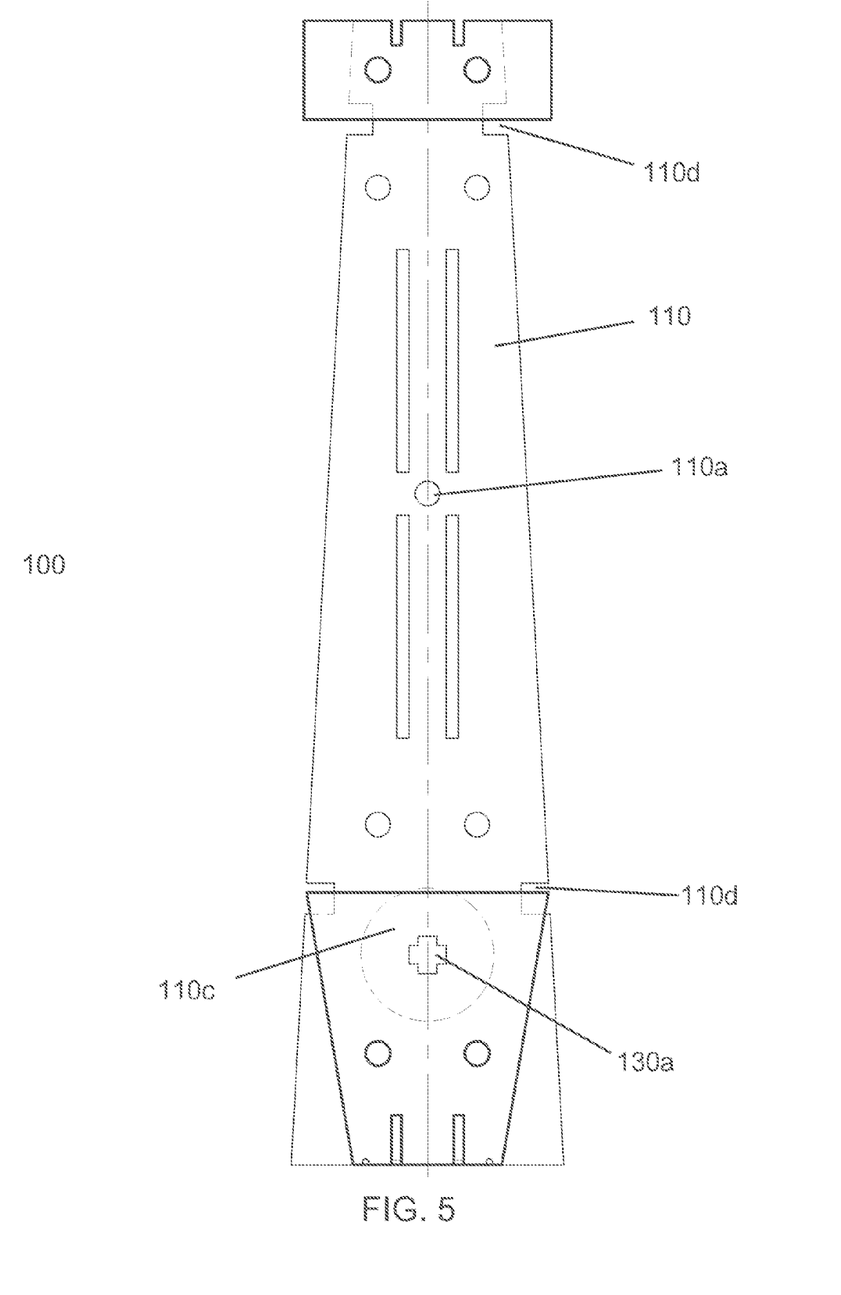
FIG. 5 illustrates an exemplary front-view of the bracketing device according to certain embodiments.

FIG. 5 illustrates an exemplary front-view of bracketing device 100 according to certain embodiments. As shown, inside main support structure 110 has a slightly tapered dimensionality, with a top (as illustrated) edge being approximately 1.75 inches long and a bottom (as illustrated) edge being approximately 3.75 inches long. As with all dimensions in this disclosure, variations are expected and meant to be included within the scope of this application.

A small light or flag post hole 110c approximately half the width of the support bracket is located approximately in the bottom one-third of the support structure as a means to insert a flag post, or the post of a lighting, or other device. An anti-rotation opening 130a is provided for the bottom of a flag pole, lighting device, or other structure to rest in and provide and an anchoring point when a device is inserted through the lighting or flag post hole 110c.

An attachment and shipping opening 110a is located approximately in the center of inside main support structure 110 for use in shipping, accessory attachment, or other reasons as practical. There are also one or more pairs of cut-outs in a shape such as a circle equidistant from each other to allow for peg board hooks, screws, or some other attachment point to be inserted to secure the bracketing device to wall, fence, peg board, or other structure. A pair or more leveling and attaching notches 110d is provided along the left and right side of inside main support structure 110 to allow for mounting, attaching, leveling or other uses as practical. The notches are used for leveling by drawing a line and can be utilized as anti-slide notches if a plastic, strap, or wire tie is used to attach them to, for example, a branch or post. The notches are directly across from each other to provide balance.

Centered on attachment and shipping opening 110a are four attachment slots in the shape of an elongated vertical rectangle. The slots are for future attachments such as sconces or other support accessories made from sheet metal.

Figure 6:
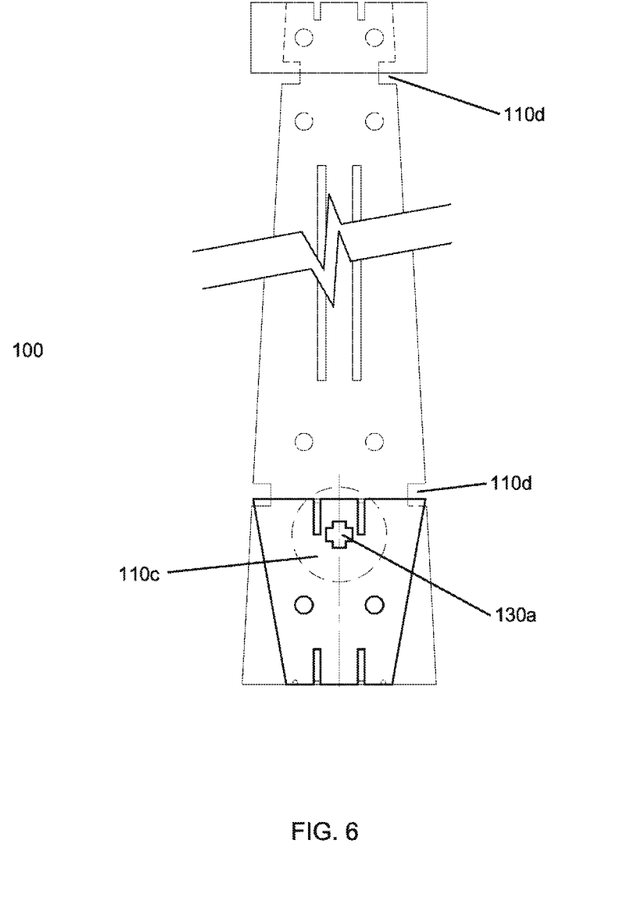
FIG. 6 illustrates an exemplary front-view of the bracketing device according to certain embodiments.

FIG. 6 illustrates an exemplary front-view of bracketing device 100 according to certain embodiments. The dimensions in this view can be similar to those as illustrated in FIG. 5. A small light or flag post hole 110c approximately half the width of the support bracket is located approximately in the bottom one-third of the support structure as a means to insert a flag post, or the post of a lighting, or other device. An anti-rotation opening 130a is provided for the bottom of a flag pole, lighting device, or other structure to rest in and provide and an anchoring point when a device is inserted through the lighting or flag post hole 110c. A pair or more leveling and attaching notches 110d is provided along the left and right side of inside main support structure 110 to allow for mounting, attaching, leveling or other uses as practical. The notches are directly across from each other to provide balance.

Figure 7:
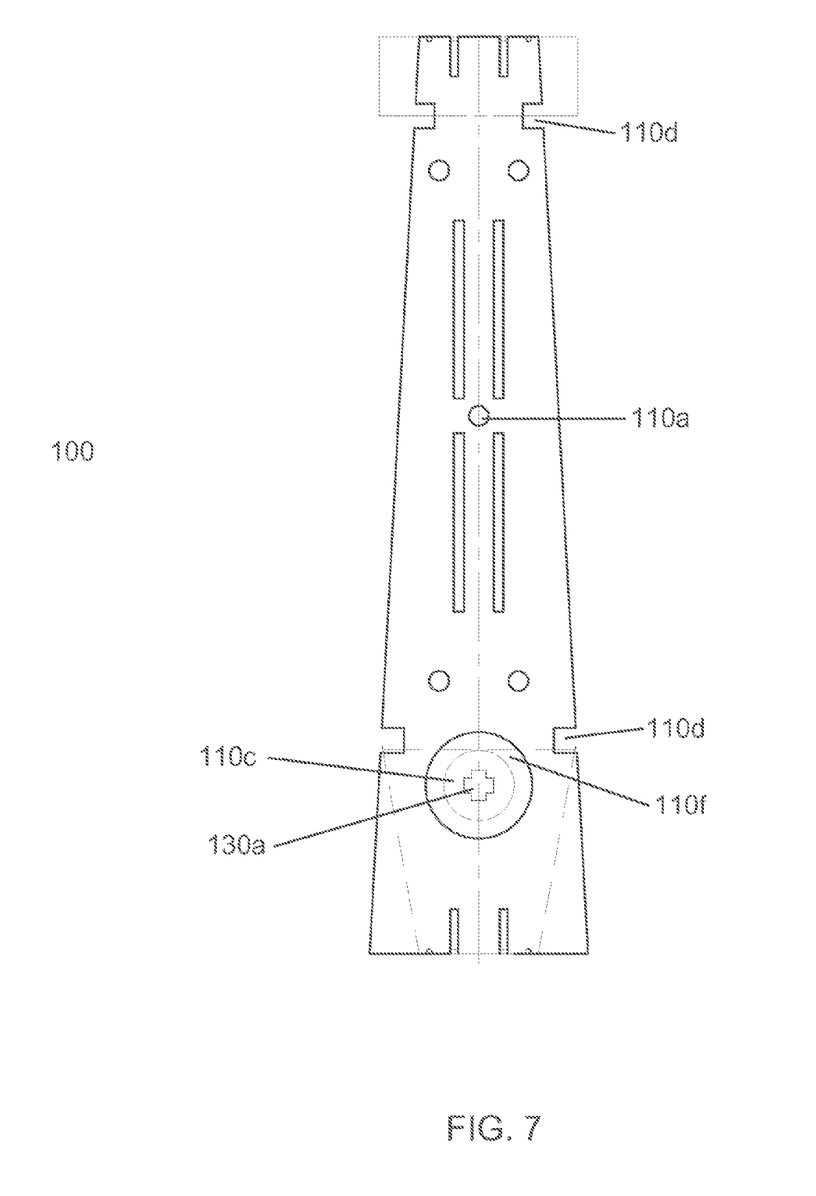
FIG. 7 illustrates an exemplary rear-view of the bracketing device according to certain embodiments.

FIG. 7 illustrates an exemplary rear-view of bracketing device 100 according to certain embodiments. The dimensions in this view can be similar to those as illustrated in FIG. 5 and/or FIG. 6. A small light or flag post hole 110c approximately half the width of the support bracket is located approximately in the bottom one-third of the support structure as a means to insert a flag post, or the post of a lighting, or other device. If the post of the flag, lighting, or other device is larger in diameter than small light or flag post opening 110c, 110f is provided as a concentric opening cutout that can be removed to allow for a larger post to be inserted into the opening.

An anti-rotation opening 130a is provided for the bottom of a flag pole, lighting device, or other structure to rest in and provide and an anchoring point when a device is inserted through the lighting or flag post hole 110c. An attachment and shipping opening 110a is located approximately in the center of inside main support structure 110 for use in shipping, accessory attachment, or other reasons as practical. There are also one or more pairs of cut-outs in a shape such as a circle equidistant from each other to allow for peg board hooks, screws, or some other attachment point to be inserted to secure the bracketing device to wall, fence, peg board, or other structure. A plurality of leveling and attaching notches 110d is provided along the left and right edges of inside main support structure 110 to allow for mounting, attaching, leveling or other uses as practical. The notches are directly across from each other to provide balance, allowing the bracketing device to remain in a standing and upright position.

Figure 8:
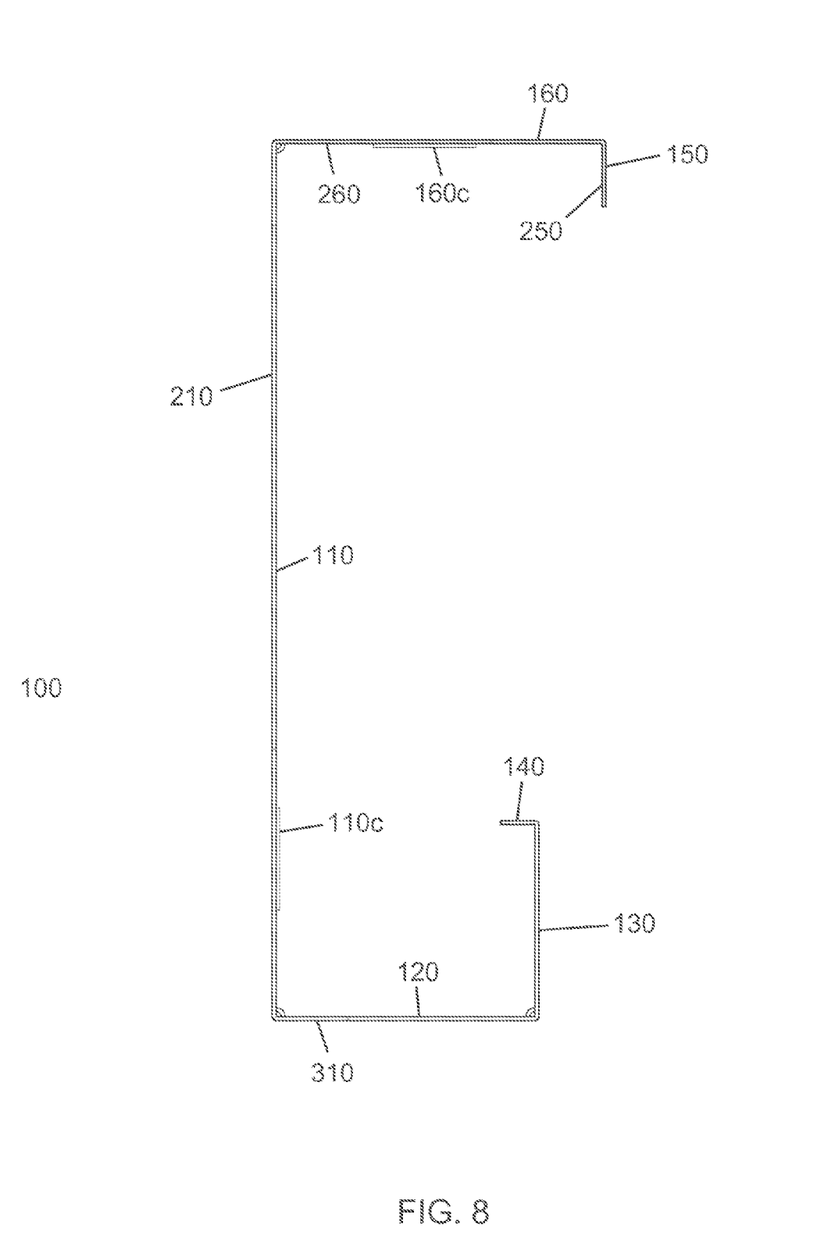
FIG. 8 illustrates an exemplary right-side view of the bracketing device according to certain embodiments.

FIG. 8 illustrates an exemplary right-side view of bracketing device 100 according to certain embodiments. As shown in FIG. 8, outside top face 150 has a length of approximately 0.88 inches, outside top 160 has a length of approximately 4.38 inches, main inside support structure 110 has a length of approximately 11.63 inches, inside bottom 120 has a length of approximately 3.50 inches, outside bottom face 130 has a length of approximately 2.63 inches and bottom lip 140 has a length of approximately 0.50 inches. As with all dimensions in this disclosure, variations are expected and meant to be included within the scope of this application.

Bottom lip 140 forms the support structure for the bracketing device to rest vertically oriented, such as, but not limited to sitting on top of a block wall. Bottom lip 140 will set flush with the horizontal aspect of the wall providing the force necessary to keep the bracketing device in place. The gusset rib dents used to reinforce the bracketing device are visible at the intersection of inside faces 130 and 120, 120 and 110, and 110 and 260. The smaller concentric post hole circle cut outs 110c and 160c are also visible in their respective inside faces.

Figure 9:
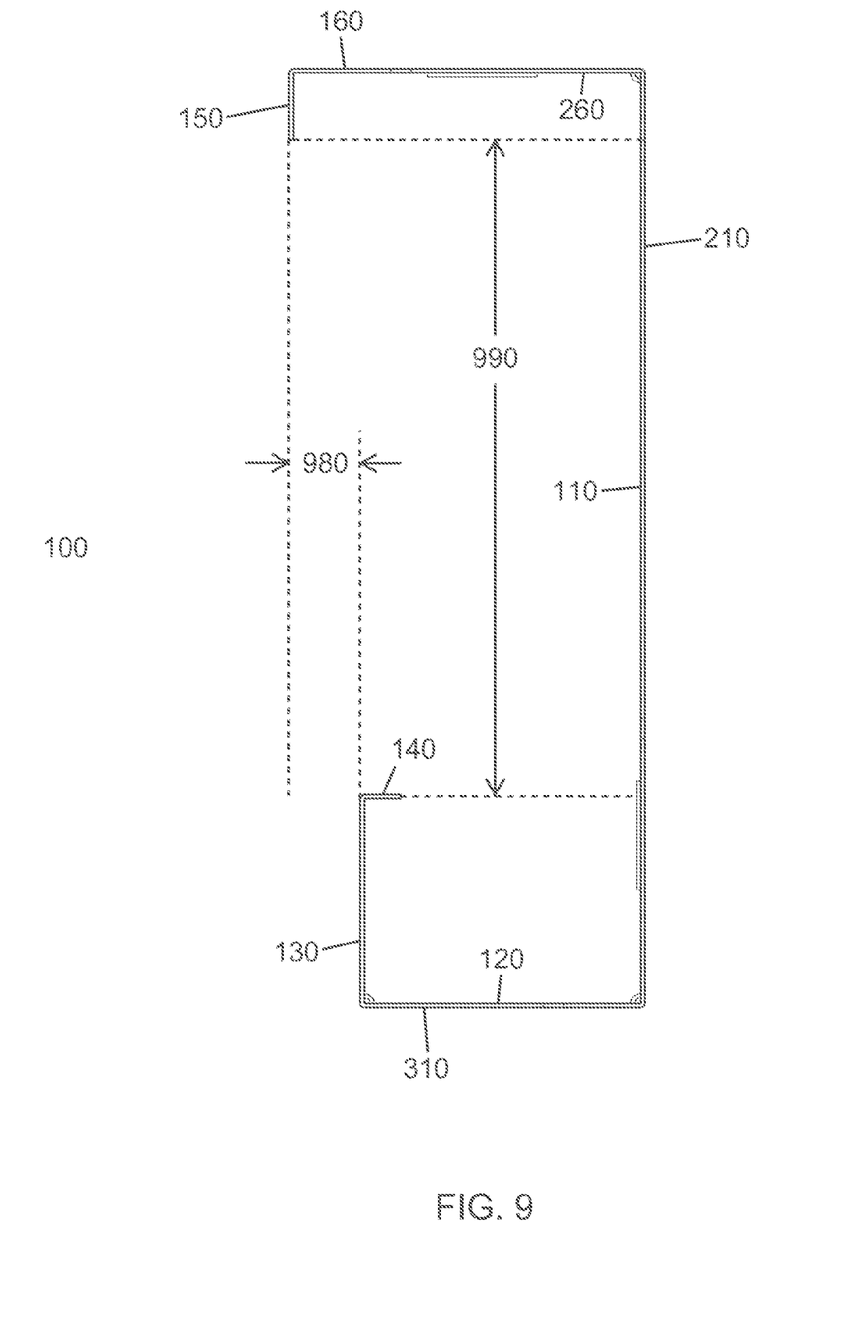
FIG. 9 illustrates an exemplary left-side view of the bracketing device according to certain embodiments.

FIG. 9 illustrates an exemplary left-side view of bracketing device 100 according to certain embodiments. The dimensions in this view can be similar to those as illustrated in FIG. 8. A wood fence offset 980 is the offset between top face 150 and outside bottom face 130. Wood fence offset 980 provides the spacing necessary for an inside top 260 to sit on top of a wooden fence or other wall like structure and can be approximately 0.75 inches of spacing. Of course this dimension can be adjusted for various thickness of wooden fencing or other wall like structures. A block wall offset 990 is the offset between a plane perpendicular to the bottom or end of top face 150 and a line extending from the end of bottom lip 140. Block wall offset 990 provides the spacing necessary for the bracketing device to be used horizontally to sit on a thicker concrete or other type of wall or fence and can be approximately 8.13 inches of spacing. Of course other "thick" walls, such as brick, rock, and the like can be facilitated by designing block wall offset with the appropriate dimension. As with all dimensions in this disclosure, variations are expected and meant to be included within the scope of this application.

Figure 10:
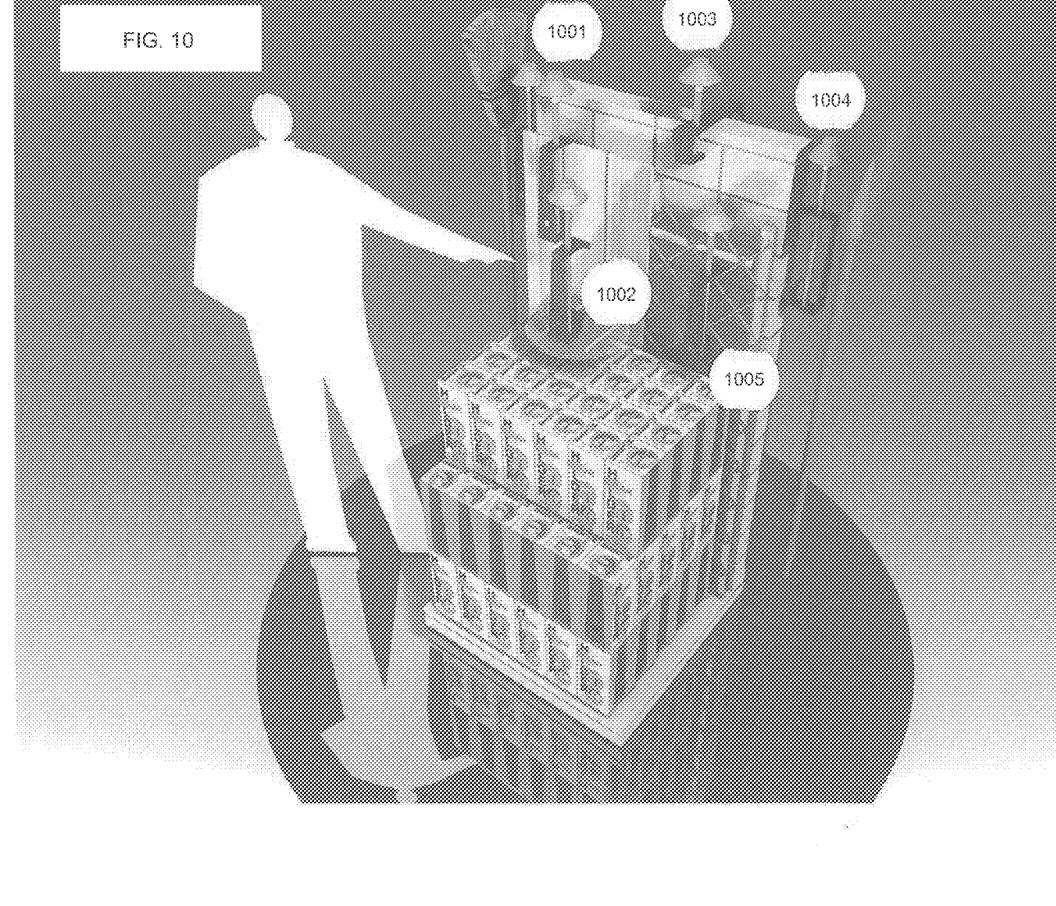
FIG. 10 illustrates exemplary installation uses for the bracketing device according to certain embodiments.

FIG. 10 illustrates exemplary installation uses for bracketing device 100 according to certain embodiments. A bracketing device mounted on a wooden fence 1001 illustrates an embodiment of bracketing device 100 resting on a wooden fence. A bracketing device setting vertically or stand-alone on a shelf 1002 illustrates an embodiment of bracketing device 100 resting on a shelf and without other support. A bracketing device mounted on a block wall 1003 illustrates an embodiment of bracketing device 100 resting horizontally on a block wall. A bracketing device mounted horizontally in a block wall 1004 illustrates an embodiment of bracketing device 100 resting horizontally in a block wall. A bracketing device mounted on a chain link fence 1005 illustrates an embodiment of bracketing device 100 resting on a chain link fence. Each of the installations also illustrates a solar lighting device, including an lighting post, being used with bracketing device 100.

Figure 11:
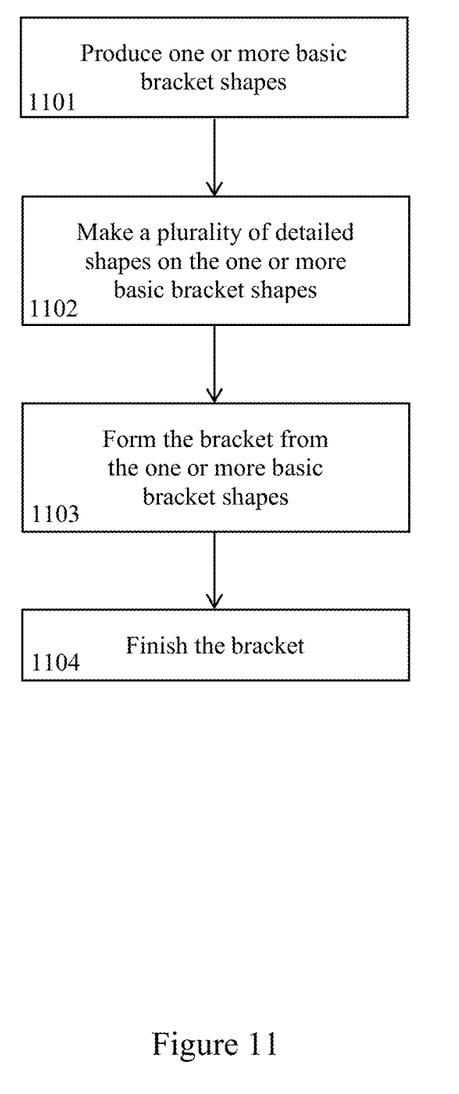
FIG. 11 illustrates an exemplary flowchart for making/manufacturing the bracketing device according to certain embodiments.

FIG. 11 illustrates an exemplary flowchart for making or manufacturing bracketing device 100 according to certain embodiments. Generally, bottom lip 140, outside bottom face 130, inside bottom 120, inside main support structure 110, outside top 160, and outside top face 150 or a combination thereof can start as a single integrated structure that ultimately forms bracketing device 100. This can be formed by one sheet being folded into the structure. Alternatively, at least a portion of the structure can be separate components that are mechanically connected, such as, but not limited to, a nut and bolt connection, connected via a welded connection, connected via another suitable type of connection, or a combination thereof, to form a portion or portions of bracketing device 100.

At 1101, a relatively flat piece of metal, either in sheet form or in roll form, can be used to produce one or more basic bracket shapes. In certain embodiments, a roll form of metal can be used. Alternatively or additionally, the bracket can be made of one or more metals including but not limited to iron, copper, steel, aluminum, tin, or any similar materials brush coated with aluminum or any other water/rust resistant material. According to certain embodiments, the bracketing device can be formed of plastic, rubber, or coated with a water resistant material.

At 1101, the basic bracket shape or the general outline of the bracket can be cut from the metal sheet or roll. This basic shape can be as if bracket device 100 as shown in FIG. 1 or 2 were flattened out into a single plane. The basic bracket shape can be cut using a drill, saw, stamping mechanism, laser, chemical etching, or high-pressure water among other methods or combinations thereof.

According to certain embodiments, the bracketing device may alternatively be constructed through injection molding or any other similar material molding process including, but not limited to extrusion blow molding, injection blow molding, stretch blow molding, compression molding, extrusion molding, matrix molding, or thermoforming and molded into the desired shape suitable for the bracketing device. According to certain embodiments, the one or more basic bracket shapes includes multiple surfaces that can be joined together at a later stage in the manufacturing or assembly process.

At 1102, the plurality of detailed shapes on the one or more basic bracket shapes is made. These detailed shapes can be made using, for example, a drill, saw, stamping mechanism, laser, chemical etching, or high-pressure water among other methods or combinations thereof. According to certain embodiments, the plurality of detailed shapes includes, for example, numerous holes, numerous slots and numerous notches within and around the basic bracket shape or shapes. These holes, slots and notches (as most were previously described), can include: accessory attachment slot shaped openings 135, lighting or flag post hole 110c, lighting or flag post hold 160c, anti-rotation opening 130a, peg board hook holes, anti-rotation opening 120a, notch for the right side of a chain link fence attachment 160a, notch for the left side of the chain link fence attachment 160b, attachment and shipping opening 110a, leveling and attaching notches 110d and attachment slots.

Both concentric opening cutout 110f and concentric opening cutout 160f will merely consist of indentations in the bracketing device. This is so that the openings do not necessarily have to be made in the bracketing device to support a smaller in circumference flag post or lighting device to be inserted. If the user is installing a thicker flag post or light post, they can merely use the indentation to remove cutouts 110f and/or 110c to allow installation of the post that is larger in circumference and will not fit within 110c and 110f.

At 1103, the bracket can be formed form the one or more basic bracket shapes. In certain embodiments, forming the bracket includes denting the single bracket shape along lines that will eventually become the approximate ninety-degree angles of the bracketing device. The folds are located at the intersection of outside top face 150 and outside top 160, outside top 160 and main inside support structure 110, main inside support structure 110 and inside bottom 120, inside bottom 120 and outside bottom face 130, and outside bottom face 130 and outside top 140. Alternatively, at least a portion of the structure can be separate components that are mechanically connected by a nut and bolt connection, a welded connection, another suitable type of connection, or a combination thereof.

At 1103, the basic bracket shape is folded for form the final bracketing device shape, having multiple approximately ninety-degree angles as embodied elsewhere in this disclosure. The folds are located at the intersection of outside top face 150 and outside top 160, outside top 160 and main inside support structure 110, main inside support structure 110 and inside bottom 120, inside bottom 120 and outside bottom face 130, and outside bottom face 130 and outside top 140.

At 1104, the final bracket shape can go through one or more finishing processes. These can include making the gusset rib dents in at least some, if not all, of the ninety-degree angle folds to reinforce the folds of the bracketing device. In certain embodiments, the gusset rib dents are located at the intersection of outside top face 150 and outside top 160, outside top 160 and main inside support structure 110, main inside support structure 110 and inside bottom 120, inside bottom 120 and outside bottom face 130, and outside bottom face 130 and outside top 140. The gusset rib dents can be made by a drill or punch or some other method to make dents or small openings in each fold of the bracketing device.

Additionally at 1104, as needed, other finish process can be performed, such as: deburring or smoothing the edges of the bracket; waterproofing or rustproofing the bracket; powder-coating the bracket, sanding and painting the bracket, packaging the bracket for sale and for transport, and similar final steps in a manufacturing process.

It should be appreciated by those skilled in the art that any dimensions provided herein are for exemplary purposes only, and that bracketing device 100 is not limited to those dimensions. Alternatively, bracketing device 100 can be used for other applications besides outdoor solar lighting, wherein bracketing device 100 is subjected to a flag pole, a device used on billboards, signs, or the like. Each of the alternatives, including variations in dimensions, variations in size and shape of surfaces, variations in size and shape of cutouts and/or variations in methods of making, is intended to be within the scope of this application and the claims listed below.

What is claimed is:

1. An apparatus for mounting a solar light post to any one of a plurality of objects, comprising:
   a main support structure having a substantially flat main shape, a main upper end and a main lower end;
   a top having a substantially flat top shape, a top front end and a top back end, the top back end being connected to the main upper end by an approximate ninety degree angle in a forward direction approximately perpendicular to a main plane of the substantially flat main shape, wherein the top defines a first notch and a second notch disposed in a substantially offset and opposite relationship;
   a top face having a substantially flat top face shape and a top face upper end, the top face upper end being connected to the top front end by an approximate ninety degree angle in a downward direction approximately perpendicular to a top plane of the substantially flat top shape;
   a bottom having a substantially flat bottom shape, a bottom front end and a bottom back end, the bottom back end being connected to the main lower end by an approximate ninety degree angle in a forward direction approximately perpendicular to the main plane of the substantially flat main shape;
   a bottom face having a substantially flat bottom face shape, a bottom face upper end and a bottom face lower end, the bottom face lower end being connected to the bottom front end by an approximate ninety degree angle in an upward direction approximately perpendicular to a bottom plane of the substantially flat bottom shape; and
   a bottom lip having a substantially flat bottom lip shape and a bottom lip front end, the bottom lip front end being connected to the bottom face upper end by an approximate ninety degree angle in a backward direction approximately perpendicular to a bottom face plane of the substantially flat shape.

2. The apparatus of claim 1, wherein the main support structure has a main support structure length of approximately 11.63 inches long, a main upper end width of approximately 1.75 inches and a main lower end width of approximately 3.75 inches.

3. The apparatus of claim 1, wherein the top has a top length of approximately 4.38 inches, a top front end width of approximately 2.50 inches and a top back end width of approximately 1.75 inches.

4. The apparatus of claim 1, wherein the top face has a top face length of approximately 0.88 inches and a top face width of approximately 2.50 inches.

5. The apparatus of claim 1, wherein the bottom has a bottom length of approximately 3.50 inches, a bottom front end width of approximately 2.75inches and a bottom back end width of approximately 3.75 inches.

6. The apparatus of claim 1, wherein the bottom face has a bottom face length of approximately 2.63 inches, a bottom face lower end width of approximately 2.75 inches and a bottom face upper end width of approximately 3.25 inches.

7. The apparatus of claim 1, wherein the first notch and the second notch are disposed in a distal one third of the top and proximate the top front end.

8. The apparatus of claim 1, wherein the main support structure defines a first opening and the top defines a second opening.

9. The apparatus of claim 8, wherein the first opening defines a first concentric opening punch-out ring and the second opening defines a second concentric opening punch-out ring.

10. The apparatus of claim 9, wherein the first and the second concentric opening punch-out rings are removable.

11. The apparatus of claim 1, wherein the bottom defines a first anti-rotation opening and the bottom face defines a second anti-rotation opening.

12. The apparatus of claim 11, wherein the first and the second anti-rotation openings are substantially cross-shaped.

\* \* \* \* \*